A. EGLI.
MACHINERY FOR MANUFACTURING CURVED PRINTING PLATES.
APPLICATION FILED JULY 28, 1908.
998,081.                    Patented July 18, 1911.
                                  8 SHEETS—SHEET 1.
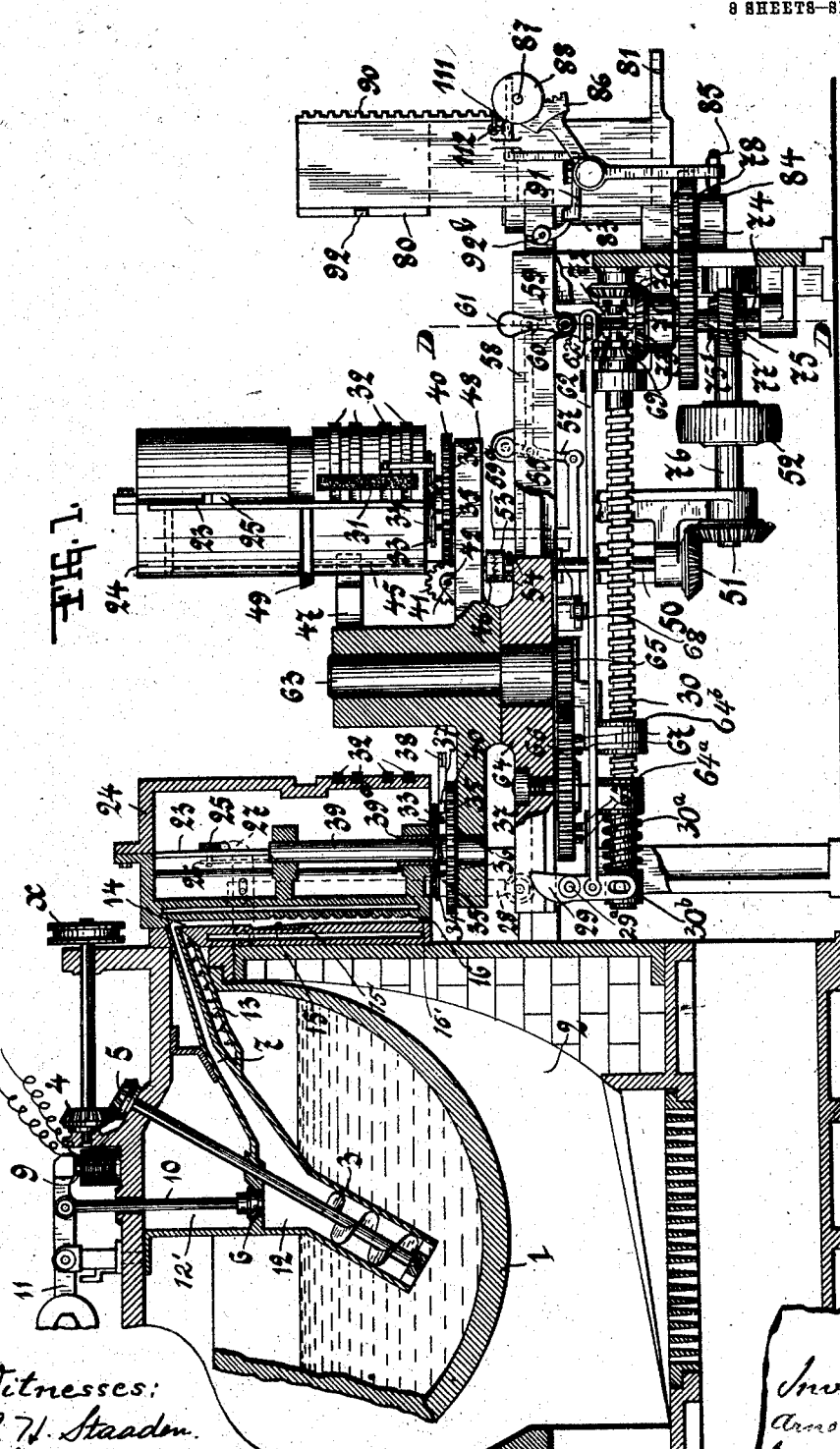
Witnesses:
L. H. Staaden.
A. Hoyer
Inventor
Arnold Egli

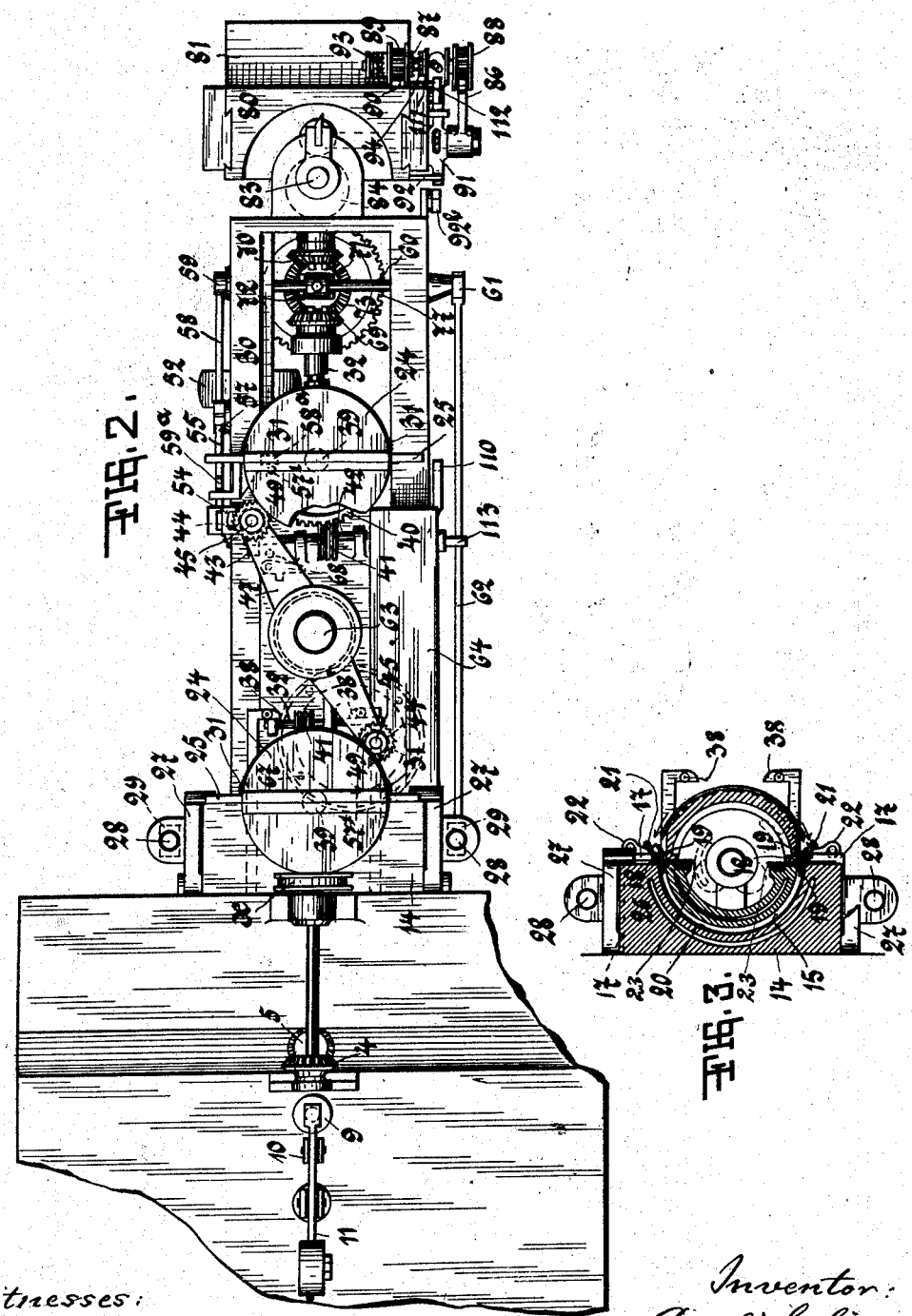

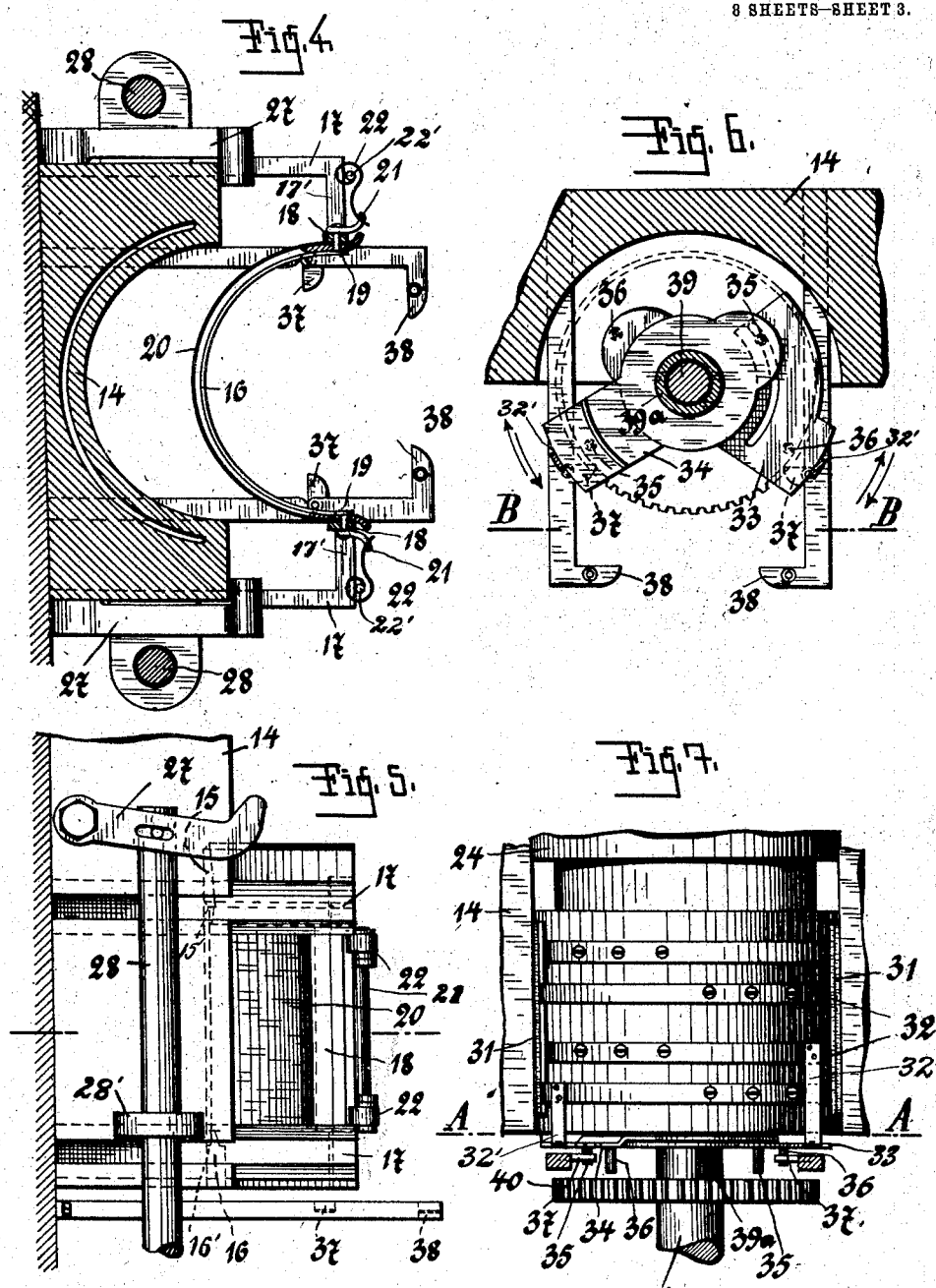

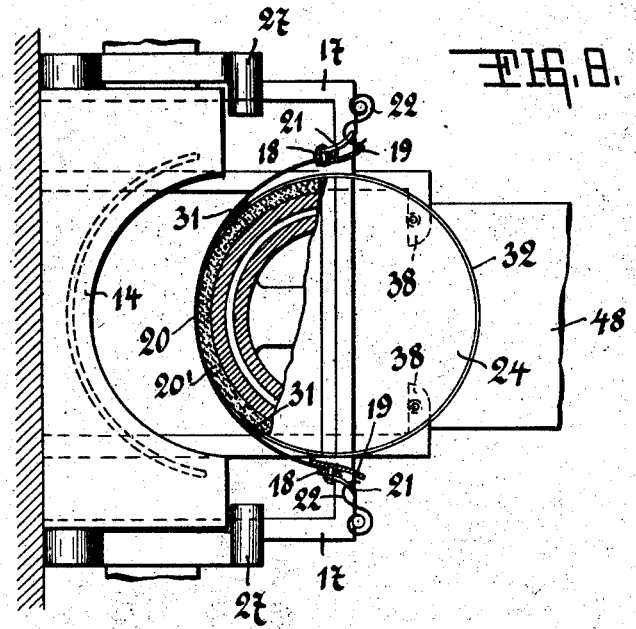
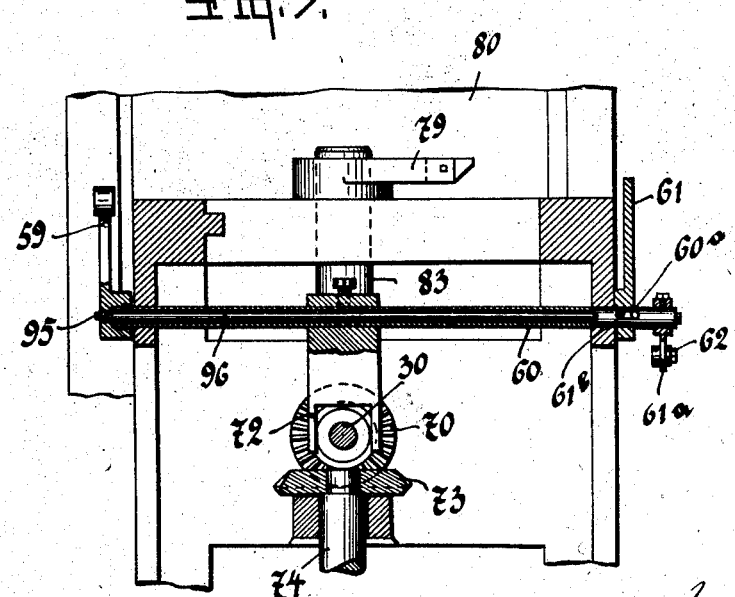

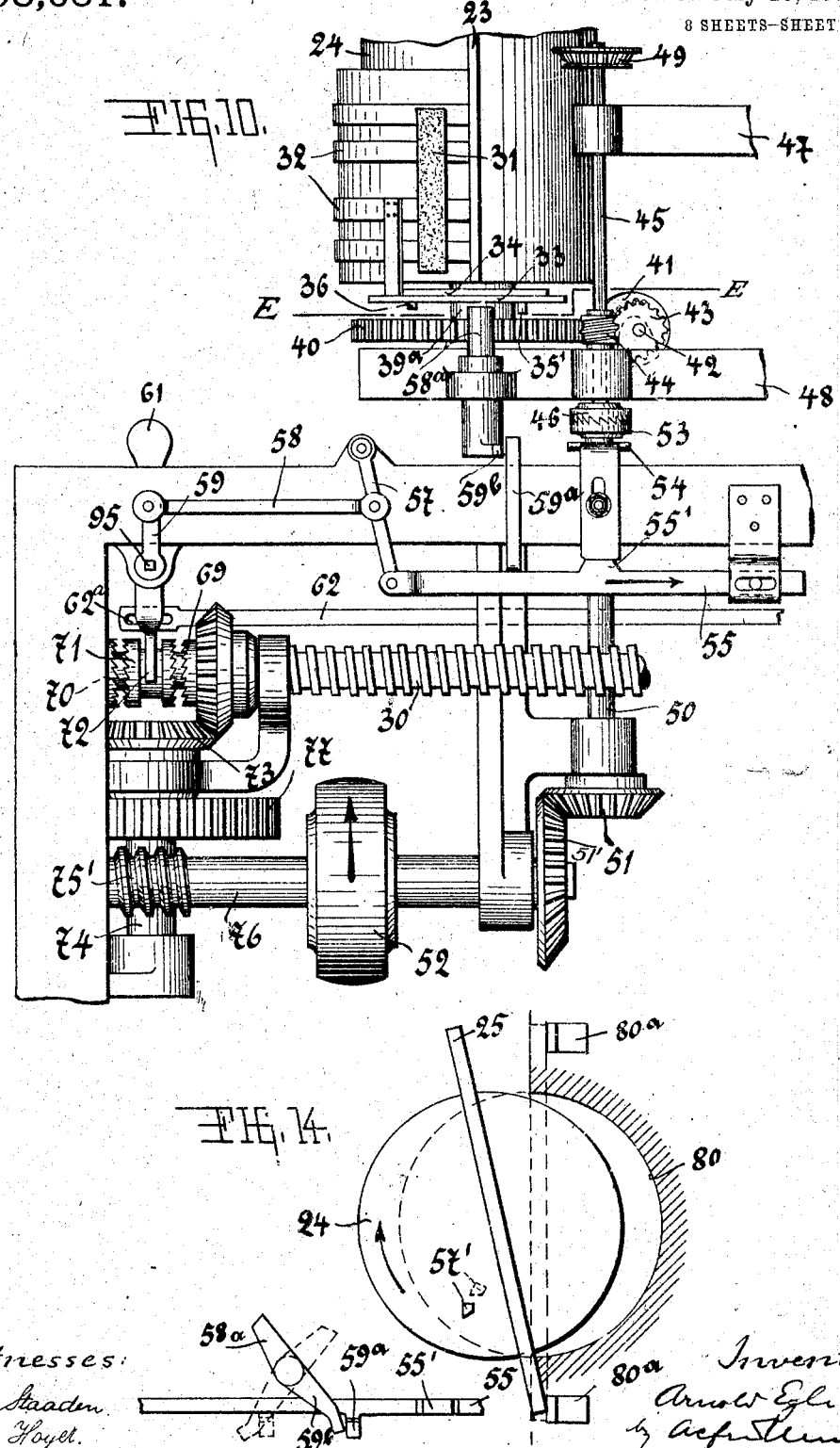

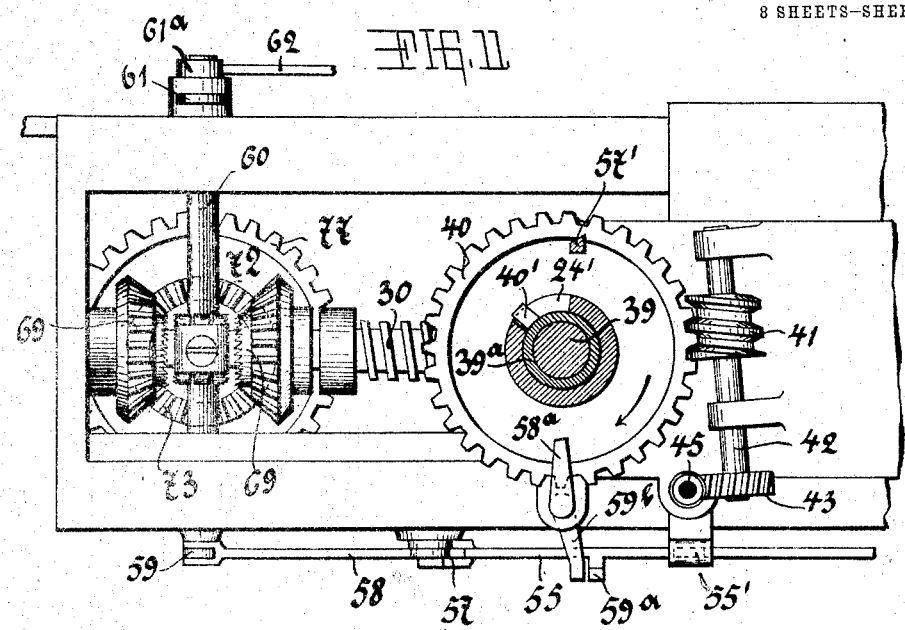
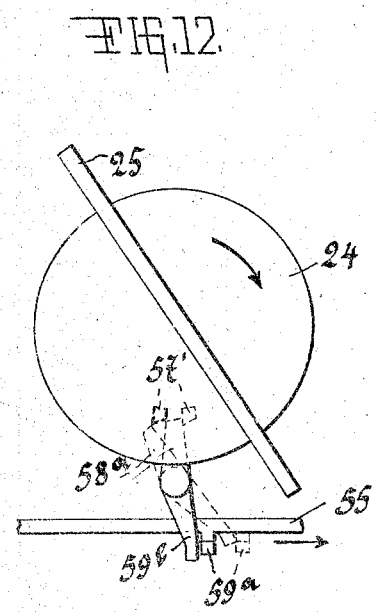
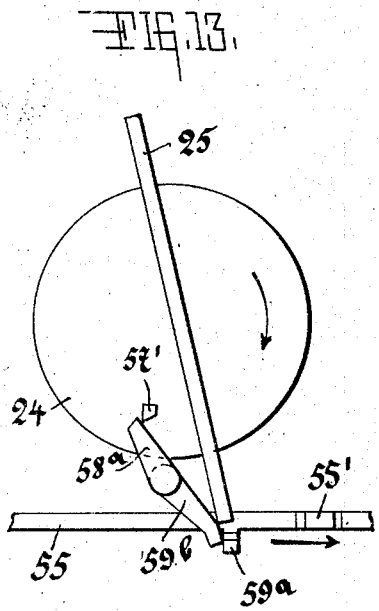

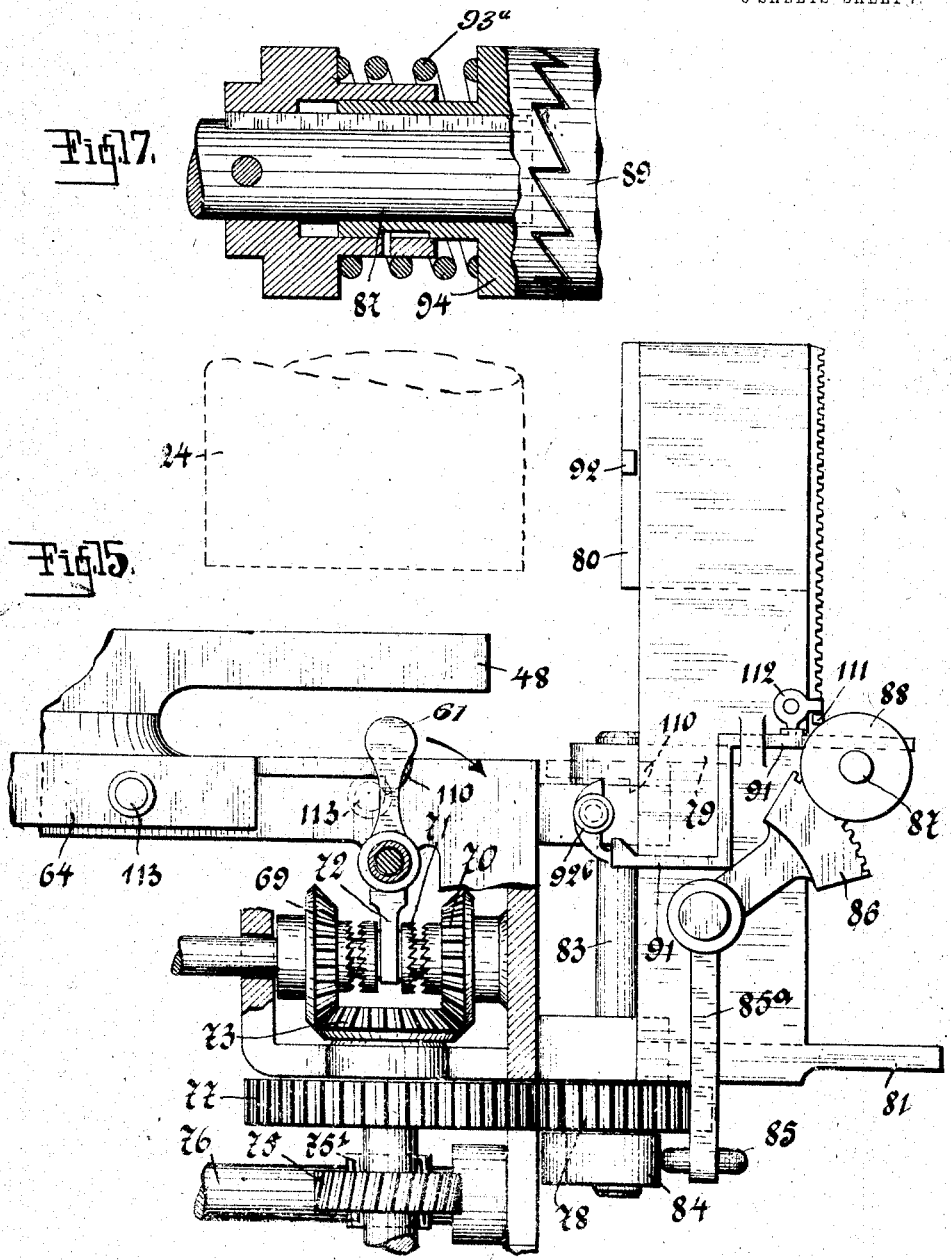

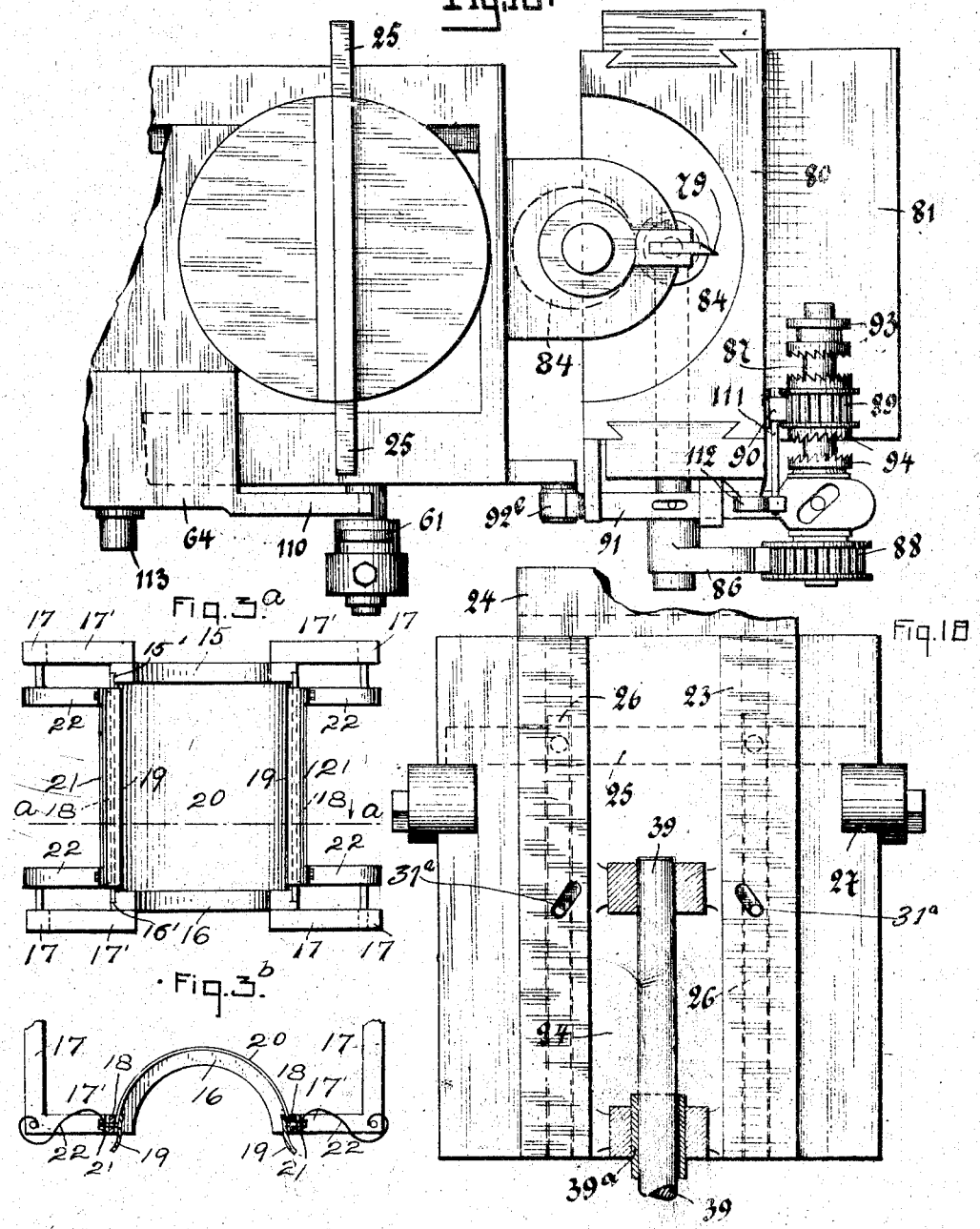

UNITED STATES PATENT OFFICE.

ARNOLD EGLI, OF PLAUEN, GERMANY, ASSIGNOR TO VOGTLÄNDISCHE MASCHINEN-FABRIK (VORMALS J. C. & H. DIETRICH) AKT.-GES., OF PLAUEN, GERMANY.

MACHINERY FOR MANUFACTURING CURVED PRINTING-PLATES.

998,081. Specification of Letters Patent. Patented July 18, 1911.

Application filed July 28, 1908. Serial No. 445,840.

*To all whom it may concern:*

Be it known that I, ARNOLD EGLI, a subject of the King of Prussia, residing at Plauen i. V., in the Kingdom of Saxony and German Empire, have invented new and useful Improvements in Machinery for Manufacturing Curved Printing-Plates, of which the following is a specification.

The object of my invention is to produce a machine for casting and finishing printing-plates (stereotype-plates) for rotary printing presses.

According to my invention, I provide a plurality of cylinders, alternately employed as core and milling cylinders and so arranged as to be brought into their alternating working positions in a predetermined order, by means of suitable mechanism to be hereinafter described.

My machine is fitted with two or more cylinders, of which, alternately, the one temporarily serves as a mold for casting a printing plate and the other temporarily acts as milling cylinder for the plate which has just been cast. The molten metal is conveyed to the mold (which during the casting operation is suitably closed) by a mixing apparatus in the shape of a screw conveyer. For holding the matrix tightly up to the core during the casting and for releasing it again after the casting, contrivances are employed consisting of segments and stops. On conclusion of the casting operation, the printing plate is separated from the matrix and core and, after the dead head has been removed the plate is conveyed to a boring device which removes the uneven places from the plate. The said boring device, like the devices for holding the plate up to the core and for releasing it, is actuated independently of the mold of the foundry furnace and of the milling cylinder in a predetermined order.

The operations of the machine are controlled by a common actuating device and by the aid of clutches and intermediate gearing and are so timed with relation to each other, that every single operation takes place at the proper time, so that a finished printing plate, though obtained from stationary matrices, is manufactured much more rapidly, than on other machines of the same class, and the operations, as a whole, are materially simplified.

My invention is illustrated in the accompanying drawings, in which:

Figure 1 is a side elevation, partly in section, of the machine, the cylinders in the milling position being shown partly rotated, the mechanism illustrated in Figs. 9 and 10 not being visible in Fig. 1. Fig. 2 is a plan of the machine. Fig. 3 is a cross-section of the mold, while on the core; Fig. 3ª is an elevation of the matrix supporting mechanism; Fig. 3ᵇ is a sectional view on line *a—a* of Fig. 3ª; Fig. 4 is on a large scale a cross-section of the mold removed from the core; Fig. 5 is, on the same scale as Fig. 4, a side-elevation of the mold; Fig. 6 is a sectional elevation of the device for actuating the brushes, the section being on line A—A of Fig. 7. Fig. 7 is a front elevation and section, on line B—B of Fig. 6, of the milling cylinder with the device for actuating the brushes. Fig. 8 is a sectional plan of the matrix and printing-plate, on leaving the mold, with the sliding brushes acting on the matrix. Fig. 9 is a side elevation, partly in section, of a portion of the boring device, the section being on line D—D of Fig. 1, on a larger scale. Fig. 10 is a side elevation of the gear for throwing the cutter-spindle in and out, the position of the milling cylinder being the same as in Fig. 1, but on a larger scale. Fig. 11 is a horizontal section on line E—E of Fig. 10. Figs. 12, 13 and 14 are diagrams showing the milling cylinder in various positions, succeeding each other in the course of operation, Fig. 12 showing the milling cylinder at the beginning of the throwing out, Fig. 13 at the end of the throwing out, and Fig. 14 at the time when it enters the boring bed. Fig. 15 is a side elevation on an enlarged scale, of the gear for reversing the slide with the casting and milling cylinders and for raising and sinking the boring bed. Fig. 16 is a plan of Fig. 15. Fig. 17 shows, on an enlarged scale, a portion of the clutch for intermittently raising and lowering the boring bed. Fig. 18 is an elevation of the printing plate with the locking rails shown in section.

The casting apparatus consists of the foundry tank 1, removably arranged in the furnace 2. Above the tank 1 is mounted an agitating device, which, at the same time, conveys the molten metal from the tank to the mold. It consists of a screw conveyer 3, mounted within a casing 12 provided with inlet and outlet openings. The conveyer is driven by bevel gears 4, 5 and a belt-pulley $x$. By this means the molten metal in the tank is maintained in constant circulation and a uniform temperature of the metal is maintained. It further serves to convey the metal to the mold 14. The feeding is controlled by a valve 6, located above the conveyer 3. The valve is normally kept open, so that the molten mass raised by the conveyer, instead of being conveyed to the mold, is discharged through the open valve 6 into the upper chamber $12^1$ partitioned off from the casing 12, from which chamber it is permitted to flow back to the tank 1, the upper chamber $12^1$ being provided with a discharge outlet not shown in the drawings. When, however, the valve 6 is closed, the metal is lifted into the passage 7 by the screw 3 and is thus fed into the mold 14, situated in front of the mouth of the passage 7. The valve 6 is closed by means of an electro-magnet 9, to which the energizing current is supplied through wires, as shown, from any source of electricity. The core 10 of the magnet 9 is secured to one arm of a weighted lever 11, pivoted to a standard mounted on the furnace. The downward movement of the weighted arm of the lever is limited by a suitable stop. The circuit inclosing the electro-magnet 9 is automatically closed by means of contacts not shown in the drawings. The said contacts close automatically at the moment when the cylinder 24, serving as a core, arrives in the casting position in front of the mouth of the passage 7. The magnet 9, when energized, pulls the arm of the lever 11 to which it is fastened down and thereby closes the valve 6 at the lower end of a rod 10 pivotally connected to the lever arm near the magnet. The valve 6 is automatically opened again by the upward pressure of the metal in the valve-chamber 12 as soon as said upward pressure becomes stronger than the attractive force of the magnet 9. The excess of pressure of the metal only occurs when the mold is filled and the molten metal fed upward by the screw 3 is no longer discharged through the passage 7. The valve 6, being forced open by the metal, therefore lifts by means of the rod 10 the lever arm to which the magnet 9 is attached, by overcoming its force, which movement is assisted by the weight on the other lever arm. This occurs, as stated, every time, when the mold is filled, and the valve 6 remains open during the period, while the cylinder 24 with the printing-plate cast around it, is being removed from its position shown in Fig. 1 and brought into the milling position. To keep the valve open during said period, the magnet 9 must be de-energized at the right moment, i. e. as soon as the cylinder 24 with the printing-plate cast to it is removed from its casting position. The contacts of the energizing circuit, having previously been closed by the cylinder 24 on arriving in the casting position, are separated by said cylinder on leaving the casting position, and the magnet 9 will not be energized again and thereby the valve 6 closed, until another cylinder arrives in the casting position and closes the contacts anew.

Immediately below the discharge end of the passage 7 a heater 13 is located to prevent the molten metal from congealing before it flows into the mold.

The concaved fixed mold member 14 is suitably carried by or adjacent to the front of the furnace 2, and is provided with means for properly engaging a matrix, and for coöperating with said cylinder 24, which is constructed to act as the opposite or convex mold member.

The means for supporting the matrix, or the so-called "matrix-lock" is carried by a matrix carriage consisting of two pairs of arms or guide-rails 17, having inturned opposing ends $17^1$ and a matrix frame. Said arms or guide-rails 17 are slidable in dovetail grooves or slide-ways formed in the sides of the mold member 14, whereby the ends $17^1$ are movable toward and away from the concaved face of said mold member 14 in two superposed sets. Resiliently mounted betwen the superposed extremities of the ends $17^1$ and supported thereby are the vertical matrix frame supporting strips 21. The resilient supporting means for said strips 21 is embodied in the comparatively heavy leaf springs 22 which are each secured at one end to studs $22^1$ carried in suitable position by said arms 17 on their ends $17'$ and have their opposite ends formed to support said strips 21, whereby said strips are freely and resiliently supported between the inner extremities of superposed arms and are spring-pressed toward one another for the purpose hereinafter set forth. Directly mounted upon the inner extremities of said ends $17^1$ and spanning the intermediate space between the ends $17'$ of each pair of arms 17 so as to lie in variable parallel relation to the concaved face of mold member 14, are the semicircular elements 15 and 16 which form part of a separable matrix frame. The upper semi-circular element 15 is secured to the under sides of the upper pair of arms 17 and the lower element 16 is secured on the upper sides of the lower pair 17, and the elements 15 and 16 are preferably provided with the opposing shoulders $15^1$ and $16^1$, (best seen in Figs. 1 and $3^a$ and in dotted lines in Fig. 5) whose function will later appear.

The separable matrix frame is completed by means of the pairs of members 18, 18 and 19, 19, forming two vertical clamps 18, 19. A matrix 20 is provided of usual semi-cylindrical form, and its longitudinal straight edges are secured between the members 18 and 19 with the latter on the inner surface. The members 18 and 19 are suitably secured, as by bolts, to the matrix and the matrix then secured to the strips 21 along said longitudinal edges through the intermediary of said clamps 18, 19. The same bolts or screws which are employed to clamp the members 18, 19 to the matrix may also be used to be passed through the strips 21 to support said matrix thereon. When the matrix has been mounted in the clamps 18, 19 and upon and between the strips 21, it is subjected to the inward pressure of the springs 22, the latter acting to seat the upper and lower curved edges of the matrix upon the shoulders $15^1$ and $16^1$ above described. By the devices just described, a matrix supporting mechanism is provided, by means of which a matrix is securely and adequately held in position to be clamped between two mold members, and is also carried in a manner which enables it to be operated on by mechanism to separate the matrix from the casting as hereinafter described. As will be seen in Fig. 1, the mold member 14 is provided with annular internal seats against which the members 15 and 16 may be seated when their mold members are brought together. The sliding guide-arms 17 stand in the extended position of Fig. 4, until the cylinder 24 is brought against the supported matrix, when the latter is carried inwardly by said cylinder and seated as shown in Figs. 1 and 5. When the cylinder 24 is withdrawn from the mold member 14, the matrix adheres to the casting, and thus draws the matrix frame and the carriage out from said mold member 14, until the separating mechanism or brushing mechanism is set into operation.

An expansion clutch or matrix lock is provided to lock the two mold members and the matrix immovably in position during the casting operation. Said lock or clutch consists of two vertically disposed blades or rods 23 movable laterally in parallel slots formed vertically in opposite sides of the cylinder 24 adjacent the clamping members of the matrix frame. Located behind the blades 23 and suspended from a transverse bar 25 which is vertically movable and projects from the sides of said cylinder 24, are the vertically slidable bars 26. Said bars 26 have pin and slot connections with the bars 23 through the diagonal slots $31^a$, so that vertical movement of said bars 26 will separate the blades 23 and cause the latter to extend outwardly through the slots in the sides of the cylinder to bear against the matrix frame and clamp the cylinder, the matrix and mold member 14 frictionally together. Said transverse bar 25 is actuated to throw the blades 23 by means of hooks or arms 27, which are pivoted to the sides of the mold member 14 and have their upturned ends in bearing contact with the under sides of the ends of said bar 25. Connected to the arms 27 by pin and slot connections and vertically slidable through suitable bearings $28^1$ on the sides of the mold member 14 are the vertical slide-rods 28 whose lower ends are provided with cam rollers which have an operative contact with the cam-members $29$ carried on opposite sides of the machine frame, and actuated from the drive shaft or screw-spindle 30, as hereinafter described.

As has been mentioned before, in order to make the operation of the machine continuous, i. e. casting, milling and boring of a plate, two or more cylinders 24 are provided, which successively are first brought up to the casting mold, then to the milling cutter and finally to the boring bed. In the construction shown in the drawings, two cylinders are employed which alternately serve as a core and as a support for the printing plate in the milling position. Each cylinder 24 is so constructed that one half of its circumference serves as a core for casting the printing plate and for supporting the same in the milling operation, and the other half carries on its lower part the brushes 31. The said brushes are wedge-shaped and secured to the outside of the cylinder 24 by the ends of resilient half-rings 32. The brushes serve to separate the matrix from the cast printing plate $20^1$ (Fig. 8) still adhering to the same. To better enable the brushes 31 to enter between the matrix and the printing plate, the front edges of the clamping bars 19 are slightly bent outwardly (Fig. 4), thereby forming a wedge-shaped space between the matrix 20 and the brush-carrier 32 upon the cast printing plate and cylinder 24. Owing to said wedge-shaped space, the brushes are enabled to first lift the elastic matrix at its edges from the printing-plate below it and then to further proceed between the matrix and plate by gently spreading the resilient matrix, thereby gradually separating the matrix from the metal of the cast plate below. The half rings 32 carrying the brushes 31 are guided in corresponding grooves of the cylinder 24 (Fig. 1), and the said rings are adapted to slide within said grooves in either direction. The sliding movement of the said rings 32 is obtained by segment-plates 33, 34 (Figs. 6 and 7), loosely mounted on the vertical shaft of the cylinder 24 below said cylinder, the said segment plates being alternately connected by stays $32^1$ with alternate rings 32. By this means the brushes 31 are shifted by the rings 32, and said rings are partially rotated by the segment-plates 33, 34. Each segment-plate has secured to it four studs 35, 36, projecting from its lower side and arranged in forward and rearward pairs, said studs being adapted to be engaged by lugs 37, 38 projecting into their path of movement when the carriage 48 is moving away from the front of the furnace 2. The said lugs 37, 38 are secured to the furnace and so arranged, that during the movement of the carriage 48 away from the furnace, the lugs 37 are first struck by the forward pair of studs 35, 36 of the segment plates, whereby the said segment plates are swung into the direction of the arrows in Fig. 3. The partial rotation of the segment plates thus produced places the rearward studs 35, 36 projecting from the opposite ends of said segment plates into position to be struck by the lugs 38, as the carriage 48 proceeds and the segment plates 33, 34, are thereby returned to their original positions. It will be seen, that the brushes 31 are forced toward each other by the sliding rings 32, from the sides of the matrix, thus lifting the matrix from the cast plate below it, after which the brushes are returned to their initial position.

When the cylinder 24 has been brought into the milling position for the purpose of removing the dead head, it must rotate in the direction opposite to that of the milling-cutters. To this end, the cylinder 24 and its driving gear 40 are loosely mounted on the shaft 39 (Figs. 1, 7 and 10). The said gear 40 has its hub 39ª coupled to the cylinder 24 by means of a pin 40¹ engaging a slot 24¹, formed horizontally in the lower bearing member of the cylinder 24, as clearly shown in Fig. 11, and the said gear 40 is driven by a worm-gear 41 upon a shaft 42 which is mounted transversely of the support 48 and to which rotary motion is imparted by a worm wheel 43 in mesh with a worm 44 on one of the cutter shafts 45. The said cutter-shafts 45 are, at their lower ends, provided with suitable clutch-mechanism 46, and are supported at their upper ends in the ends of brackets 47 and at their lower ends in the sides of the support 48 (Figs. 10, 11) said cutter shafts being two in number, one for each cylinder.

Rotary motion is imparted to the cutter-shafts 45 through vertical shaft 50, carrying bevel gear 51 in mesh with similar bevel-gear 51¹ upon a driven shaft 76 having mounted on it a driving pulley 52 (Fig. 10). The shafts 50 and 45 are adapted to be coupled by means of a clutch member 53 adapted to slide on shaft 50 and to be thrown into engagement with the corresponding clutch member 46 on shaft 45 by means of a shifter 54. The said shifter 54 is under control of a sliding rod 55 provided with a raised cam-face 55¹, which, when passing below the shifter 54, lifts the clutch-member 53 into engagement with the clutch-member 46. When the clutch is to be disengaged, said rod 55 moves from under the shifter 54, and the clutch is opened gradually. To one end of the sliding rod 55 is connected a lever 57, the other end of which is pivoted to the frame of the machine. To this lever is pivoted at an intermediate point a link 58, the other end of which is pivoted to a lever 59 adapted to turn loosely on a hollow shaft 60. Within the said hollow shaft 60 a stem 96 is slidingly arranged and the end of said stem within the hub of the lever 59 is provided with a square portion 95 which, when projecting from the hollow shaft 60, enters into a square hole of the hub of lever 59, as clearly shown in Fig. 9, thereby coupling the lever 59 to said shaft 60. The other end of the hollow shaft 60 has secured to it by a slot and pin 61ᵇ (Fig. 9) a hand-lever 61. Owing to this connection, the stem 96, engaged by the pin 61ᵇ may be shifted in axial direction, the said pin moving in the slot 60ª of the hollow shaft 60. The square end of the shaft 96 may thereby be withdrawn from the hub of lever 59, which latter, together with the above-described lever-and rod-connection 58, 57, 55, will then be independent of the rocking motions of the shaft 60. Such independent movement may be desired for permitting the support 64 of the cylinder 24 to run in either direction, independent of the milling gear, for the purpose of cleaning the cylinder. Normally, however, the hollow shaft 60 is coupled to the link 59 by the square portion 95 of the stem 96. The end of the hollow shaft 60 adjacent to the lever 61, carries another lever 61ª secured to it, and said lever 61ª has pivotally connected to it the rod 62, the other end of which is connected with the eccentric 29 (Fig. 1), controlling the locking device of the mold, as already described. It is clear that by shifting the stem 96 mounted inside the hollow shaft 60 (Fig. 9) in the direction of the arrow, thus coupling the shaft 60 with the link 59 by means of the square end 95, the mold will be locked and, simultaneously, the milling gear started into motion.

When the milling operation is completed, the gear should automatically be stopped and the clutch-members 70, 71, thrown into engagement for the purpose hereinafter described. To this end from the bottom end of the cylinder 24 projects a stud 57¹ (Figs. 11, 12, 13, 14), adapted to engage a lever arm 58ª, before the cylinder 24 has reached its normal position. Said lever 58ª is secured to the frame of the machine and is swung out by the stud 57¹, whereby the lower arm 59ᵇ of lever 58ª comes to engage a vertical arm 59ª projecting from the sliding rod 55 with the result of shifting the same in the direction of the arrow shown in Fig. 10. The rod 55, on being thus displaced, passes with its cam surface 55¹ from under the shifter 54, thereby allowing said shifter and the clutch-member 53 supported by it to automatically drop out of engagement with the clutch-member 46. The cylinder 24, accordingly, is automatically stopped before it reaches its normal position, and, by simultaneously throwing into gear the screw-spindle 30, the cylinder is fed on to the boring bed. Said screw-spindle 30 is threaded in the movable nut 64$^b$ carried by a bracket located and extending below said carriage 64, to move the latter when said spindle 30 is actuated, and is supported for a limited longitudinal resilient movement in the collar 64$^a$, suspended below the frame of the machine, by having a spring 30$^a$ encircling said spindle 30 and bearing between said collar 64$^a$ and a fixed shoulder 30$^b$ on the end of said spindle.

To return the stud 57¹ to its normal position ready for the next action, i. e. behind the lever arm 58 and out of the path of said arm 58 when the cylinder 24 returns to the mold, the cylinder 24 must be returned from the milling position to the initial position by giving it a partial turn. This is obtained by making the projecting right-hand end of the bar 25 impinge upon a stop 80$^a$ (Figs. 2 and 14) secured to the boring bed, whereby the cylinder 24 and its stud 57¹ are turned to occupy their normal position, as indicated by the dotted lines in Fig. 14. To bring about this partial rotation of the cylinder 24, the latter is coupled with its driving gear 40 in such a manner as to allow of a partial rotation of said cylinder independently of the gear. To this end, the hub of cylinder 24 has a slot 24¹ in its lower end to receive the above-mentioned pin 40¹, projecting from the hub 39$^a$ of the wheel-shaft 39. On turning the cylinder 24 to its starting position, as shown in Fig. 11, the said pin 40¹ will be moved to one end of the slot 24¹, as shown, and when the clutch-members 46, 53 have become engaged, the wheel 40 will, first, turn idly till the stud 40¹ has traveled to the opposite end of slot 24¹, and from this time on the cylinder 24 will be carried along till the stud 57¹ throws the milling gear out of operation. As it would appear, the throwing out of the milling gear would simultaneously lock the mold through the medium of the hollow shaft 60, which is given a partial turn, and by the lever 61$^a$ and rod 62 connected to said shaft 60. To prevent such locking of the mold, the right-hand end of the rod 62 has a slot 62$^a$ (Fig. 1) engaging the pin of lever 61$^a$. Due to said slot, not only the clutch-members 69, 71 may be made to engage either manually or by mechanical means, independently of the rod 62, and without actuating the locking device of the mold, but also the clutch-member 71 may be disengaged from the clutch-member 69 by means of the eccentric 29 and rod 62.

At the end of each casting and milling operation the two cylinders 24 are caused to travel to change their positions for a new cycle of operations. In order to produce such change of position, the support 48 carrying the cylinders 24 is rotatably mounted on a shaft 63 and carried by a carriage 64. Shaft 63, to which the gear 65 is rigidly secured below the carriage 64, is intermittently rotated by a main gear 66, having four pins 67 axially projecting from it, of which pins, one at a time, during the travel of the carriage 64 and cylinders toward the mold, will strike against a stop 68 (Figs. 1 and 2) resiliently secured to the frame of the machine. By the engagement of said stop, the wheel 66 will be turned one quarter of a revolution. On traveling in the opposite direction, from the mold to the milling position, the stop 68, when struck by one of the pins 67 will turn aside without causing a partial revolution of the wheel 66. The gear wheel 66, having twice as large a diameter as the gear 65, the shaft 63 and the support 48 with the cylinders 24 will be turned 180° for every quarter of a revolution of the gear 66, and through such half revolutions of the support 48, the two cylinders 24 are made to exchange their positions.

The traveling motion of the carriage 64 in the longitudinal direction of the machine is produced in a well-known manner by means of a screw spindle 30 rotatably mounted in the frame of the machine. To one end of said spindle 30 the above-mentioned eccentric 29 is connected, while the other end of said spindle carries the bevel gears 69, 70, both meshing with a third bevel gear 73. Between the two bevel-wheels 69, 70, which are loosely mounted on the spindle 30, the latter carries a clutch 71 fast on the spindle, but capable of longitudinal movement. Each of the bevel-gears 69, 70 has a clutch-member formed on or secured to it, and the intermediate clutch 71 can be shifted to engage either one or the other of said clutch-members. The shifting of the clutch 71 is caused by a fork 72 engaging between the two sides of the clutch and secured to the hollow shaft 60. Said fork 72 depends from a tubular element which fits upon and is keyed to said hollow shaft 60, as by a set screw. The fork 72 may be actuated either manually by means of the hand-lever 61, or by mechanical means actuated from the lever 61$^a$. The shifting of the clutch in one or the other direction will each time reverse the motion of the screw-spindle 30 from its previous motion. The shaft 74 of the bevel-gear 73 carries a worm 75, which is engaged by a worm-wheel 75¹ on the driving shaft 76 (Figs. 1 and 10). The shaft 74 also has secured to it a gear-wheel 77 in mesh with a small gear-wheel 78 carried by the driving shaft 83 of the boring device and adapted to rotate the boring tool, which operates upon the inner curved surface of the printing plate, to smooth the same after the dead-head has been removed.

The boring bed 80 is located at the end of the machine frame, opposite to the mold, and to said bed the printing plate is delivered from the milling position. From the boring bed the finished printing plate is delivered to the delivery table 81, from which it is finally removed. The boring bed 80 is adapted to be intermittently lowered and raised, while sliding in grooves of the machine frame. To produce the intermittent movements a cam disk 84 is provided, keyed to the driving spindle 83, and having a bearing contact with a friction roller 85 carried by the arms of a lever 85ª, the other arm of which lever is provided with a segmental rack 86 in mesh with a ratchet-wheel 88 on the shaft 87, from which motion is imparted to another ratchet wheel 89 (Fig. 2), whereby a vertical rack-bar 90 secured to the boring-bed 80 is raised or lowered, according to the direction, in which the said ratchet wheels 88 and 89 are made to turn. The rack 90, however, is actuated only after the boring cutter 79 has left the surface of the printing plate under work and continues its course out of contact therewith. The raised portion of the cam 84, accordingly, must be at right angles with relation to the cutter 79.

In order to produce an intermittent motion of the boring-bed 80, upwardly as well as downwardly, the two members 93, 94 of the clutch between the ratchet wheels 88 and 89 (Fig. 16) are controlled by a spring 93ª (Fig. 17). On forward motion of the toothed segment 86, said spring 93ª causes the spring-actuated member of the clutch to engage the other member of said clutch keyed to the shaft 87, causing it to rotate and thereby move the boring bed in one direction by the aid of the pinion 89 and rack 90. On the return movement of the segment 86 to its initial position, the clutch member rigidly secured to the shaft 87 will act in the manner of a ratchet device imparting no motion to the pinion 89 and rack 90. The motion of the boring bed 80 in a vertical direction is controlled by a shifter 91, which, in the extreme lower position of the bed, is actuated by a stop 92 projecting from the bed 80 near its upper end in the path of said shifter, and in the extreme upper position of the bed by a bent lever 92ᵇ, with the result of moving the said shifter in a longitudinal direction. The bent lever 92ᵇ is actuated by a hook-shaped projection 110 on the carriage 64 (Fig. 16), which, when reaching the right-hand end position of its course, catches behind the nose on top of lever 92ᵇ after the milled printing plate has been delivered to the boring bed. Then, when the carriage 64 begins to return to the left toward the mold, the projection 110 engaging the lever 92ᵇ will throw said lever over and thus advance the shifter 91 to the right, whereby the clutch-member 94 is thrown in. Owing to the slanting slot in the shifter 91, engaged by a pin projecting from a collar on shaft 87, the shaft 87, with the clutch-members 93, 94 will be alternately coupled with the pinion 89, and the return motion of the carriage 64 is produced in the manner described.

Every time, the boring bed has reached its highest position, the clutch-member 93 will be thrown out by a stop 111 provided at the lower end of the rack bar 90. This stop 111 bears against an arm of a bent lever 112 and, by turning it, causes the shifter 91 to move a slight distance, sufficient to throw out the clutch-member 93. The boring bed 80 continues to remain in its raised position, until another milled printing plate arrives at the boring bed with the carriage 64. Coincident with the delivery of a plate to the boring bed, the clutch-member 71 is disengaged from the clutch-member 70 and thrown into engagement with clutch-member 69, thereby reversing the motion of the screw-spindle 30 and carriage 64. The disengagement of the clutch-member 71 from the clutch 70 and its engagement with the clutch 69 is produced at the proper time by a stud 113 (Fig. 16), projecting from the side of the carriage 64 and striking against the hand-lever 61, as indicated by the broken lines in Fig. 15, when the carriage 64 has reached the boring bed.

After the printing-plate has been finished by the tool 79, it will remain upon the table 81, while the boring bed 80 returns to its original position under control of shifter 91, actuated by the lever 92ᵇ and projecting arm 110, as already described, the stop 111 and bent lever 112 serving to stop the return motion of the boring bed 80.

The operation of the machine is as follows: The matrix 20, having been introduced between its retaining bars 18, 19, and secured there by screws, or other suitable fastening means, the driving gear is started by the belt-pulley 52. The clutch-member 71, normally occupying an intermediate position between the two clutch-members 69 and 70, is thrown into engagement with the clutch-member 69 by the hand-lever 61. The screw spindle 30 causes the carriage 64 to move in a direction to place the two cylinders 24 carried by the support 48 in their working positions, i. e. one of the said two cylinders is placed before and pushed into the mold 14, while the other cylinder will occupy the milling position. To cause engagement of the clutch-members 71, 69, and to simultaneously start the driving gear of the machine, the hand-lever 61 is moved from its central position (Fig. 1) to the right in (Fig. 1), thereby giving the hollow shaft 60 a partial turn, and returning the parts 58$^a$ and 59$^b$ to their working position by means of the slide-rod 55 and arm 59$^a$, as indicated by the broken lines in Fig. 14. The carriage 64, after having brought one of the two cylinders 24 up to the mold 14, is stopped by said cylinder bearing against the mold. The screw, nevertheless, continues to turn, and owing to its being resiliently cushioned by the spring 30$^a$ (Fig. 1), moves back within its nut 64$^a$ in the direction of its length, thereby turning the eccentric 29 on its pivot 29$^a$. By throwing the eccentric 29 to the right in Fig. 1, the rod 62 pulls the lever 61$^a$ and thereby gives a partial turn to the shaft 60 carrying the shifter 72, thus causing the same to disengage the clutches 69, 71, whereupon the screw spindle is stopped. By the same movement, to the right of the eccentric 29 its operating face is moved to the left, and lifts the rod 28 engaged by the locking hooks 27, whereby the cross-bar 25 of the cylinder 24 and the locking bars 26 are equally raised. Said locking bars 26 being connected by the pins 31$^a$ (Fig. 18) with the bolts 23, the latter will be raised to lock the mold. The cylinder 24, on being moved up to the mold, will abut against contacts (not shown) thereby closing the circuit of the electro-magnet 9, which, by attracting the lever 11 will close the valve 6 and cause the conveyer screw 3 to feed molten metal up through the channel 7 into the mold, till the latter is completely filled. The metal, then, finding no further outlet into the mold, raises the valve 6 and separates the lever 11 from the magnet 9.

While the casting of one printing plate is performed, the shifting of rod 62 to the right has turned the hollow shaft 60 having coupled to it the link 59, and through said link and connecting levers 57, 58, the clutch 53 has been thrown into engagement with the clutch 46, thereby causing the milling cylinder to be started and the printing plate carried thereby to turn with relation to the milling cutter 49 applied to it. Said cutter removes the dead head from the printing plate. The milling of the dead head is performed during one revolution of the milling cylinder, whereupon the stud 57$^1$ projecting from the cylinder disengages the clutch-members 46, 53 through the agency of the arm 59$^b$ and rod 59$^a$, as clearly shown in Figs. 10 to 14. The disengagement of the clutches 46, 53 is produced in such a manner, that after the completion of the milling operation the stud 57$^1$ will strike the lever-arm 58$^a$, thereby pushing it aside. This causes the combination of levers, rods and links 59, 58, 57, 55 to be shifted in the direction of the arrows, Fig. 10 and, further, the throw of lever 61 to the left of its position in Fig. 1. The clutch 53 is thus released from the clutch 46, and the partial turn given to the hollow shaft 60 moves the clutch member 71 from its central position into engagement with the clutch-member 70. The screw spindle, accordingly, will be turned in the opposite direction and the eccentric 29 returned to its initial position. In consequence, the bars 25 and 26 also will return to their lower positions, carrying along with them the locking bolts 23 holding the cylinder 24 against the mold. The cylinder 24 is now free to be carried away by the carriage 64 to the milling position. During this time the matrix 20 is moved to the position, shown in Fig. 4, and the lugs 37, 38, actuate the brushes 31, forcing the same, first, below the bars 19 to lift the sides of the matrix from the cast plate, and then the said brushes proceed farther toward each other to completely separate the matrix from the plate. The carriage 64, while continuing its course to the right of the machine, carries the milled printing plate to the boring bed 80, having a lug 80$^a$, whereby the cylinder is turned to its initial position. The printing plate is released from the cylinder 24 in any suitable manner, and is received on the boring bed and returned there by any suitable means. The carriage 64, having delivered the plate to the boring bed 80, pushes the lever 61 over by the stud 113 and, thereby, causes the clutch-member 71 to reëngage the clutch-member 69. The carriage 64 will now move to the left, placing one of the two cylinders before the mold and the other cylinder 24 into the milling position. While retreating, the carriage 64, having its arm 110 engaged by the nose of lever 92$^b$, pushes the said lever over, thereby shifting the rod 91 to the right, and causing the clutch-member 94 to engage the clutch-member of pinion 89. The boring bed, carrying the printing plate, is now intermittently lowered by the aid of the mechanism comprising the parts 84, 85, 85$^a$, 86 and 88, till the printing plate has been finished and is delivered upon the table 81. By reason of the spring-actuated parts of the clutches 93, 94, the boring bed 80 will be fed on, downward and upward, during the stroke in one direction only of the reciprocating segment 86, and the feeding of the boring bed, downward and upward, will be performed intermittently, i. e. during the time, when the cutter, after leaving the surface of the work, idly pursues its path outside of the boring bed. When the cutter has completed its work and the printing plate has been bored smooth and the dead-head has been entirely removed, the printing-plate will remain upon the table 81, while the dead-head, resting on the top of the boring bed, will be carried off to be used again in the melting furnace. When the boring bed has been completely lowered, the motion is reversed by the stop 92 causing the shaft 87 and clutch members 93, 94 to move in a manner as to throw the clutch 94 out of and the clutch 93 into engagement with the clutch-member of the gear 89, thereby reversing the course. The boring bed 80, having been intermittently raised again to its initial position, is stopped at the right time by the stop 111, striking the projecting arm of the bent lever 112, thereby actuating the shifter 91 and disengaging the clutch-members 93, 94.

During the return movement of the carriage 64 from the boring bed toward the mold, one of the pins 67 projecting from the gear-wheel 66 will strike the pivotal stop 68 carried by the machine-frame, and the support 48, carried by the carriage, will be turned 180 degrees about the shaft 63, thereby causing the two cylinders 24 to change their position. The cylinder 24 which has just delivered the printing plate to the boring bed is placed before the mold and a new printing plate is cast, while the one cast before is moved into the milling position. The operation may thus be uninterruptedly continued.

I claim:

1. In a machine for casting and finishing stereotype plates for rotary printing presses, a plurality of cylinders serving alternately as casting core and milling cylinders, and means for conveying the cylinders from one working position to another in a predetermined order.

2. In a machine for casting and finishing stereotype plates, a semi-cylindrical mold member, a cylinder comprising the opposite mold member and fitting into said semi-cylindrical member, means for introducing said cylinder into said mold member and then removing it therefrom, means comprising radially movable blades and actuating latch bars contained in said cylinder for clamping the latter to said mold-member and means for actuating said latch bars for locking and unlocking the mold.

3. In a machine for casting and finishing stereotype plates, a semi-cylindrical mold member, a cylinder comprising the opposite mold member and fitting said semi-cylindrical member, means for supporting said cylinder parallel to said mold-member and introducing said cylinder into said mold member and then removing it therefrom, means contained in said cylinder and projecting from its cylindrical surface, for clamping said members together, and means for actuating said mold clamping means.

4. In a machine for casting and finishing stereotype plates, comprising in combination, a plurality of cylinders serving alternately as casting core and milling cylinders, a molding member, milling means, means for conveying the cylinders from one working position to another, and means for positioning the cylinders during the conveying operation to present the casting in proper relation successively to the molding member and the milling means.

5. In a machine for casting and finishing stereotype plates, comprising in combination, a plurality of cylinders serving alternately as casting core and milling cylinders, a molding member, milling means, means for conveying the cylinders from one working position to another, and means for rotating the cylinders on their axes simultaneously with the conveying operation, to present the casting in proper relation successively to the molding member and the milling means.

6. In a machine for casting and finishing stereotype plates for printing presses, a semi-cylindrical mold comprising a fixed and a movable mold member, a sliding support mounted in front thereof and carrying the movable part of said mold, a matrix mounted in said mold, brushes also carried by said sliding support and disposed adjacent said movable part of said mold to separate the matrix from the casting, and means to actuate said brushes.

7. In a machine for casting stereotype plates, a semi-cylindrical mold comprising a fixed mold member and a movable member, a reciprocating support for moving said movable member into said fixed member, a matrix disposed in said mold, a series of brushes carried by said support and extending around said movable member concentrically thereof in position to separate said matrix from the casting, and means for actuating said brushes as said movable member is retracted from the fixed member.

8. In a machine for casting stereotype plates, a semi-cylindrical mold comprising a fixed concaved mold member and an interfitting movable member, a reciprocating support for moving said movable member into said fixed member, a matrix, a frame carrying said matrix and movable parallel to said reciprocating support, a series of brushes carried by said support and extending around said movable member concentrically thereof in position to separate said matrix from the casting, and means for actuating said brushes as said movable member is retracted from the fixed member.

9. In a machine for casting stereotype plates, a semi-cylindrical mold comprising a fixed concaved mold member and an interfitting movable member, a reciprocating support for moving said movable member into said fixed member, a matrix, a frame resiliently carrying said matrix and movable parallel to said reciprocating support, a series of brushes carried by said support and extending around said movable member concentrically thereof in position to separate said matrix from the casting, and means for actuating said brushes as said movable member is retracted from the fixed member.

10. In a machine for casting stereotype plates, a semi-cylindrical mold comprising a fixed concaved mold member and an interfitting movable member, a reciprocating support for moving said movable member into said fixed member, a matrix, a frame carrying said matrix and comprising arms movable parallel to said reciprocating support, and matrix-supporting bars spring-supported on said arms, a series of brushes carried by said support and extending around said movable member concentrically thereof in position to separate said matrix from the casting, and means for actuating said brushes as said movable member is retracted from the fixed member.

11. In a machine for casting and finishing stereotype-plates for rotary printing presses, a slide, a vertical shaft projecting therefrom, a cylinder carrier turning on the shaft, a pinion on the shaft below the slide, a gear pivoted to the slide in mesh with the pinion and presenting studs, and a stop pivoted to a stationary part, and adapted upon being struck by one of said studs to rotate the said pinion and gear and thereby the said carrier, substantially as and for the purpose set forth.

12. In a machine for casting and finishing stereotype plates, a semi-cylindrical mold member, an oppositely disposed milling means for finishing the casting, a carriage mounted to be reciprocated between said mold member and said milling means, and a plurality of cylinders carried by said carriage and adapted to be alternately presented to said mold member and said milling means, and means for rotating said cylinders to present the same sides first to said mold member and then to said milling means.

13. In a machine for casting and finishing stereotype plates, molding means and milling means, a cylinder adapted to complete the formation of the mold and to act as a support for the casting when in front of the milling means, a reciprocating carriage upon which said cylinder is mounted, means on said carriage for actuating said cylinder to impart a half revolution thereto, to present the same portion of the cylinder before the molding means and the milling means and means for introducing the cylinder into said molding and milling means.

14. In a machine for casting and milling stereotype plates for printing machines, a molding means, a milling means, a reciprocating carriage mounted between said molding means and said milling means, a revoluble support on said carriage, and revoluble cylinders carried by said support and adapted to coöperate in turn with said molding means and said milling means to receive the casting and to mill the same.

15. In a machine for casting and milling stereotype plates, a molding means, a milling means, a reciprocating carriage mounted between said molding means and said milling means, a revoluble support on said carriage, revoluble cylinders carried by said support and adapted to coöperate in turn with said molding means and said milling means to receive the casting and to mill the same, and means for interposing a matrix between said molding means and said cylinders in position to be independently moved in the line of movement of said carriage.

16. In a machine for casting and milling stereotype plates, a molding means, a milling means, cylinders adapted to be alternately presented to said molding and said milling means, a matrix supported between said molding means and each of said cylinders in turn, and means for separating said cylinder with the casting from said matrix, said separating means consisting of wedge-shaped brushes disposed on opposite sides of said cylinders, supports therefor, and means operating on said supports to insert said brushes between said matrix and said casting on opposite sides and to move said brushes over the surface of the cylinder.

17. In a machine for casting and milling stereotype plates, a molding means, a milling means, cylinders adapted to be alternately presented to said molding means and said milling means, a matrix, means for resiliently supporting said matrix between said molding means and each cylinder in turn, and means for separating said cylinder and its casting from said matrix, said separating means consisting of wedge-shaped brushes disposed to be inserted between said matrix and the casting, to spread said matrix in its resilient supporting means and relieve the casting thereof.

In testimony whereof I have signed my name to this specification in the presence of two subscribing witnesses.

ARNOLD EGLI.

Witnesses:
ALBERT HORN,
CHARLES LUHTMANN.